United States Patent [19]

Treseder

[11] Patent Number: 4,488,192
[45] Date of Patent: Dec. 11, 1984

[54] COOLING ARRANGEMENT FOR HERMETICALLY SEALED DISK FILES

[75] Inventor: Robert C. Treseder, Aptos, Calif.

[73] Assignee: International Business Machines Corporation, Armonk, N.Y.

[21] Appl. No.: 383,043

[22] Filed: May 28, 1982

[51] Int. Cl.$^3$ .............................................. G11B 23/02
[52] U.S. Cl. ........................................ 360/98; 360/97
[58] Field of Search ................................... 360/97–99, 360/133, 135, 86, 87

[56] References Cited

U.S. PATENT DOCUMENTS 4,396,964  8/1983  Morehouse ........................... 360/98

FOREIGN PATENT DOCUMENTS 54-55413  2/1979  Japan ...................................... 360/98

OTHER PUBLICATIONS

IBM/TDB, "Disk File with Reduced or Eliminated Air Effects"; Tietze; vol. 23, No. 9, Feb. 1981, p. 4310.

Primary Examiner—A. J. Heinz
Attorney, Agent, or Firm—Richard E. Cummins

[57] ABSTRACT

A movable head disk file is disclosed in which the disk enclosure is hermetically sealed to prevent contamination from the surrounding atmosphere from adversely affecting the head-disk interface relationship. The heat that is normally generated in the enclosure from the electrical components and as a result of the friction between gas molecules in the container and the surface of the rotating magnetic disks is transferred from the enclosure through the baseplate of the file to a thermal conduction module disposed outside the disk enclosure. The thermal conduction module is water cooled by a closed loop circulating system. The temperature of the enclosure is, therefore, controlled since the heat generated in the file is transferred to the thermal module through the baseplate which is in a thermal conducting relationship to the thermal module, whose temperature, in turn, is controlled by the velocity of the water circulating through the module. The walls of the enclosure may be insulated and a plurality of the files stacked next to each other if desired since there is no adverse thermal effects on the surrounding environment from any of the disk files. The heat that would normally be transferred to the surrounding environment is removed from the immediate area by a suitable water-to-water heat exchanger similar to that employed in normal air conditioning systems.

1 Claim, 4 Drawing Figures

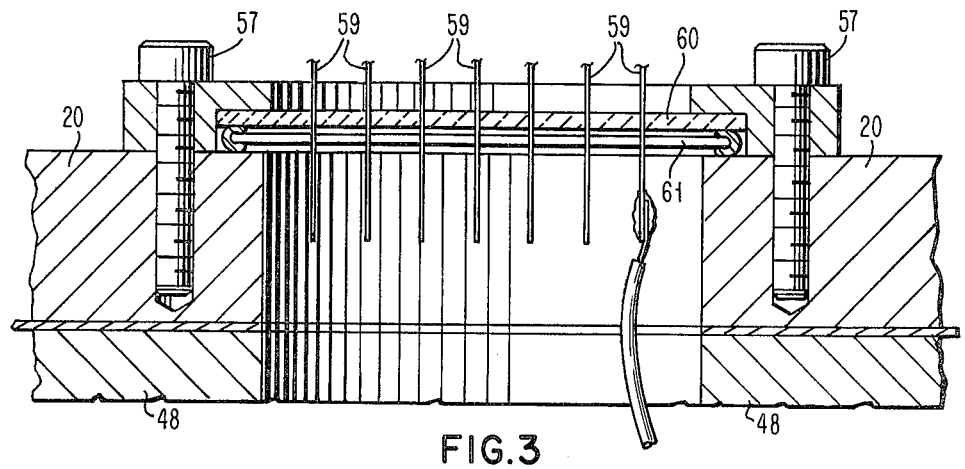
FIG.3
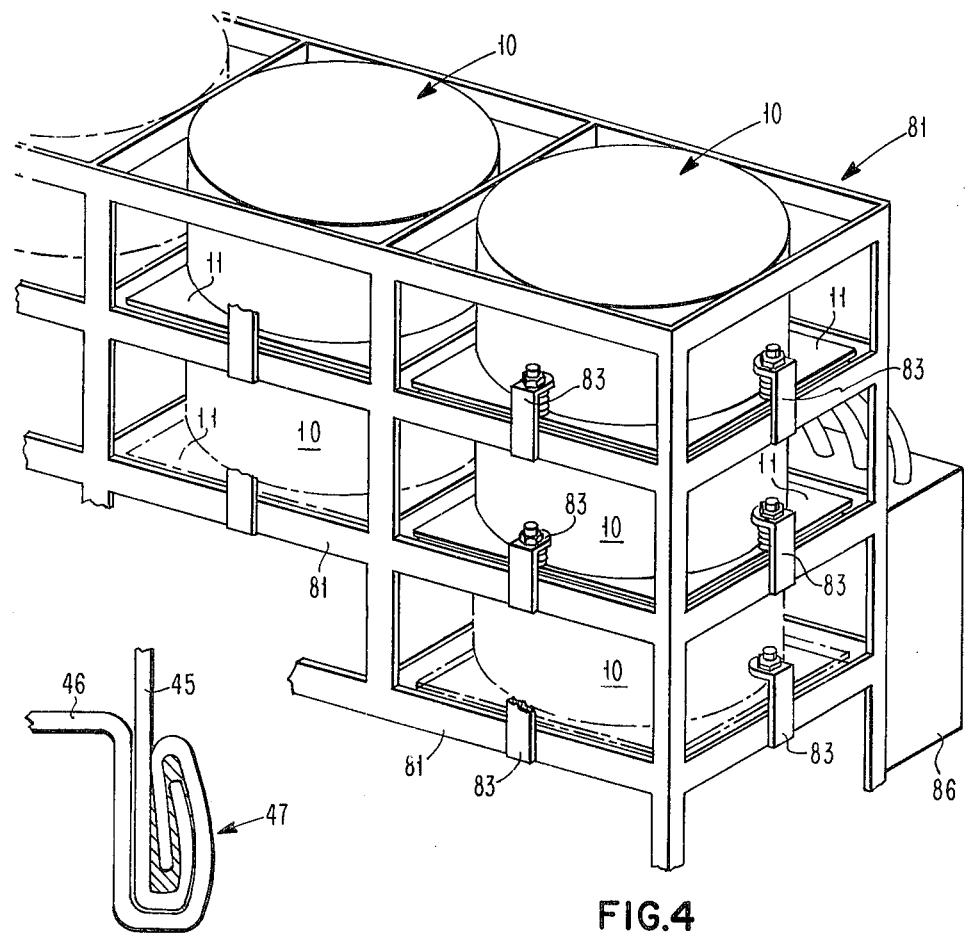
FIG.2
FIG.4

COOLING ARRANGEMENT FOR HERMETICALLY SEALED DISK FILES

BACKGROUND OF THE INVENTION

1. Field of Invention

This invention relates in general to disk files and, in particular, to an improved arrangement for controlling the temperature within a hermetically sealed disk file enclosure.

2. Description of the Prior Art

The function of a disk file is to store data for use by a data processing system. Various disk file configurations are suggested in the prior art. In general, data is stored on a magnetic disk surface in concentric recording tracks, each of which is assigned a unique address. A magnetic transducer is positioned in recording relationship with a selected track in response to an address signal supplied to a suitable positioning system.

As the capacity of disk files has increased, the aspects of temperature control of the disk enclosure have become more important from a number of different standpoints. It is known, for example, that heat is generated by the disk rotating in the enclosure and that the amount of heat will depend on the size of a disk and its speed of rotation. Thus, if one desires to increase storage capacity by merely increasing the number of disks in the file, some adjustment must be made to the overall configuration to insure that (1) a safe temperature is not exceeded, and (2) the temperature will be somewhat constant throughout the enclosure. The need to limit the temperature in the disk enclosure to some safe value is based on the fact that certain components, for example, integrated circuits, are mounted in the disk enclosure and are adversely affected if their normal operating temperature is exceeded.

In most prior art files, air cooling of disk enclosures is employed which requires a suitable blower to circulate air through the enclosure to remove heat. When an open loop system using ambient air is employed, various filters are used to insure that particles or contaminates in the air are removed prior to entering the disk enclosure. The character of the filter depends to a large degree on the head to disk spacing that has been established for the disk file recording system. Since one way to increase storage capacity is to increase linear recording density, which, in turn, is dependent to a large degree on the spacing of the magnetic head relative to the disk surface, the filter should be capable of removing particles from the air that would upset the air bearing relationship that is established between the head and the disk surface. Current disk files employ head to disk spacing in the range of 10 to 30 micro-inches, requiring relatively dense filters to remove unwanted contamination. If the recording density along the track is to be increased by decreasing the head to disk spacing, then some consideration must also be given to filtering out contaminants in the air that would upset the air bearing relationship. This generally involves some change to the air flow and, hence, temperature control.

It will be appreciated that, in this connection, while increasing the air flow through the disk enclosure will remove any additional heat, the power to circulate that air is also increased while the life of the filter is decreased, requiring an earlier replacement. In addition, the heat that is normally removed from the file must be dealt with, especially if a number of disk drives are located in the same area. Since it is not uncommon in large data processing systems to have 50 or more files in one area, the total amount of heat being removed is substantial. Special air conditioning requirements are, therefore, normal in such installations.

It is further known to increase storage capacity by increasing track densities. Many current disk files have track densities approaching 800 tracks per inch. In this area of track density, thermal considerations are extremely important in files which employ track following servo systems along with comb type accessing mechanisms. In such systems, a servo transducer cooperates with a separate servo surface to position the transducer carriage at a selected track or cylinder of tracks. The tracks on different disk surfaces at the same address form the cylinder. It has been found that the position of a track in a cylinder may vary relative to its original cylindrical position due to thermal effects in the disk enclosure. This phenomena is referred to as thermal track shift and, in some situations, can result in a degree of misalignment of the transducers relative to the track to cause data errors. The phenomena is caused by an uneven temperature distribution in the disk enclosure which causes a warmer disk to expand more than a relatively cooler disk. The phenomena also exists when the file is initially powered on, when the temperature within the disk enclosure is changing from ambient to its normal operating temperature where all components have reached a stable condition. This warmup period is, of course, a disadvantage since it may take 15 minutes or more to stabilize the temperature of the components within the disk enclosure.

The amount of heat being dissipated by the file also limits the manner in which the files can be physically configured in any installation. Since ambient air is required for cooling, files must be spaced so that each file is capable of receiving the required amount of ambient air. The prior art has recognized that the heat generated by the rotating disk surface can be reduced if the disk enclosure is filled with a gas that is less dense than air. Such an arrangement implies a hermetically sealed disk enclosure such as is shown in applicant's copending application Ser. No. 219,794 filed Dec. 24, 1980 which issued as U.S. Pat. No. 4,367,503 and is assigned to the assignee of the present invention. When a gas such as helium is employed in place of air, the drive motor of the file and the actuator for positioning the heads must also be included within the disk enclosure. If the motor is outside of the disk enclosure, there is no practical way to seal the drive motor shaft as it passes through the container to the disk hub in order to rotate the disk. As a result, a new heat source, i.e., the windings of the motor, must be considered in determining the thermal characteristics of the hermetically sealed disk file.

However, while the advantage of a hermetically sealed disk enclosure employing a helium gas is somewhat diminished because of the heat generated by the motor windings and the heat generated by the windings of the transducer positioning system, the overall thermal characteristics of the file are still considerably improved.

A disk file which generates a minimum amount of heat and a disk file enclosure which permits removal of the heat in an efficient manner so that storage capacity of the file may be increased allowing an increase in the storage packaging density of the files is desirable and needed. The present invention fulfills such a need.

SUMMARY OF THE INVENTION

It has been found in accordance with the present invention that the temperature of a hermetically sealed disk file enclosure can be readily controlled by an arrangement which removes heat from the enclosure by thermal conduction through the base plate to a water-cooled thermal conduction module disposed in heat transfer relationship to the baseplate of the file.

In the preferred embodiment, the enclosure is defined by a thin wall container which is clamped between the baseplate and the thermal conducting module to provide a hermetically sealed enclosure capable of holding a gas, such as helium, at slightly above ambient pressure for the life of the file. (The disk file enclosure described in applicant's copending application Ser. No. 219,794 U.S. Pat. No. 4,367,503 is one example of a thin wall container construction suitable for the disk enclosure of the present invention). Since the temperature of the enclosure is readily controlled, a number of disk files may be arranged in close proximity to each other since the affect on the ambient air temperature of the surrounding environment is minimal and may be further minimized or totally eliminated by suitably insulating each enclosure and relying on the thermal conduction module and the heat transfer efficiency of the water-cooled module to achieve the required temperature control.

It is, therefore, an object of the present invention to provide an improved arrangement for controlling the temperature of a disk file enclosure.

Another object of the present invention is to provide a temperature control arrangement for a disk file which is relatively compact.

A still further object of the present invention is to provide a temperature control arrangement for a disk file which is independent of the surrounding environment so that files may be packed closely together without any adverse affects.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 2 is an enlarged view of the seam between the base and cylindrical wall of the enclosure of FIG. 1;

FIG. 3 is an enlarged view of the electrical lead through area of the enclosure shown in FIG. 1 illustrating how electrical signal leads enter their hermetically sealed enclosure;

FIG. 4 illustrates diagrammatically an arrangement for mounting a number of disk enclosures shown in FIG. 1 in a stacked relationship in a frame.

DESCRIPTION OF THE PREFERRED EMBODIMENT

Figure 1:
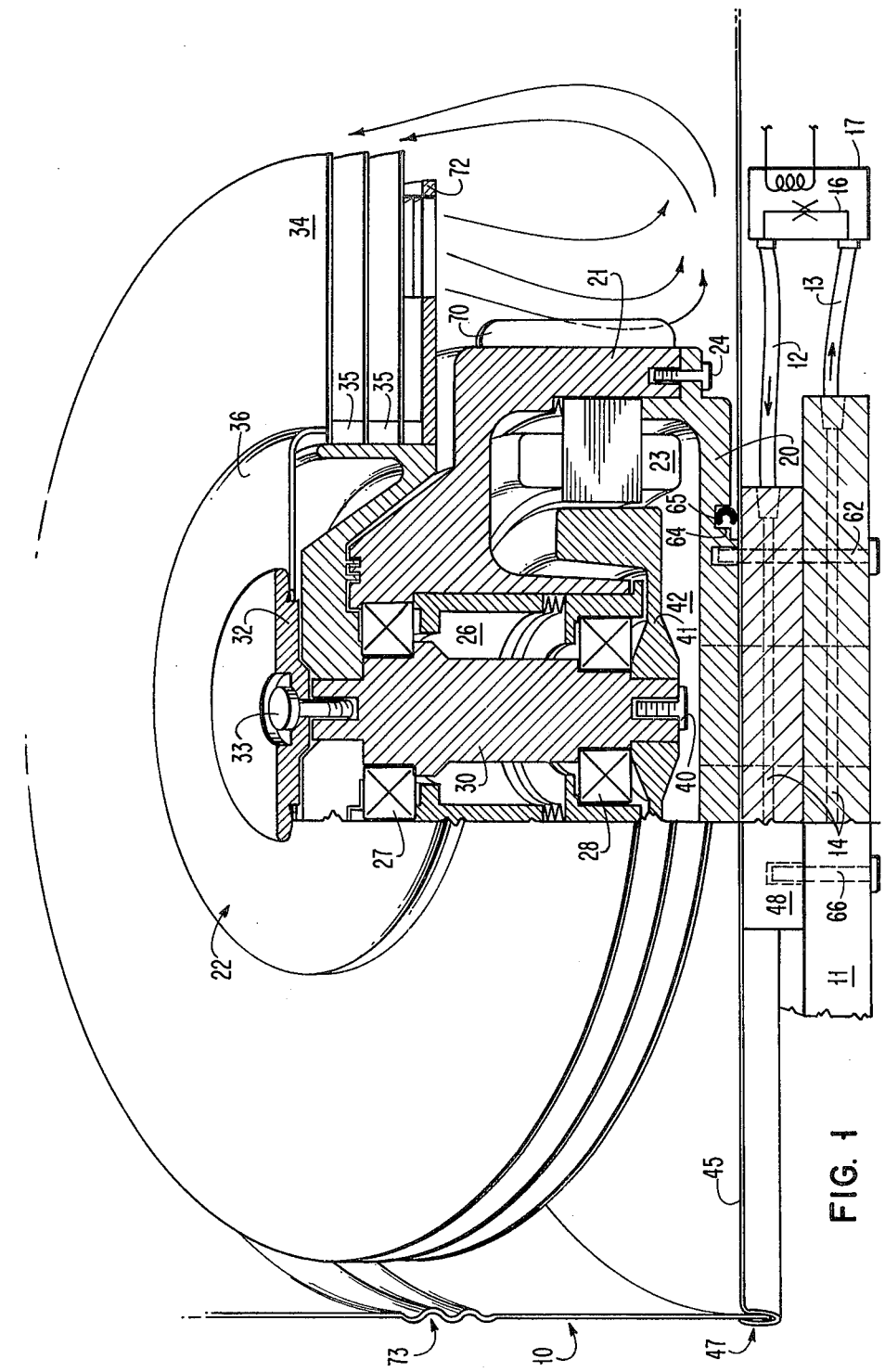
FIG. 1 is a perspective view of a disk file enclosure partly in section illustrating a preferred embodiment of the present invention.

The preferred embodiment of the invention is illustrated in FIG. 1 and comprises generally a disk file enclosure 10 in combination with a thermal conduction module 11 which, as illustrated, is connected to a source of cooling fluid by hoses 12 and 13. Module 11, as shown, is a substantially rectangular block which is provided with a plurality of passages 14 for circulating the fluid provided from inlet hose 12 throughout the block to outlet hose 13. The passages 14 are arranged to provide sufficient transfer of heat to the fluid from the block and efficient movement of the fluid between the inlet and outlet openings. It will be assumed for purposes of explanation that the fluid is water and that the inlet and outlet hoses are connected to a suitable closed loop circulating system 16 which includes a suitable heat exchanger 17 that functions to cool the water to a predetermined temperature before it is returned to the module through inlet hose 12.

As shown in FIG. 1, the disk enclosure includes a relatively rigid baseplate 20 which may be circular in shape and arranged to receive an annular disk assembly support member 21 which functions to mount the disk assembly 22 and the stator 23 of the drive motor. The support member 21 is attached to the baseplate 20 at its circumferential edge by suitable bolts 24. Baseplate 20 may be provided with an extension for mounting the actuator (not shown) employed to position movable magnetic heads relative to predefined recording track positions. Support member 21 is provided with an axially extending cylindrical boar 26 for receiving a pair of spindle bearings 27 and 28. The disk assembly 22 comprises a disk spindle 30 which is supported by bearings 27 and 28 for rotational movement relative to support member 21 and baseplate 20. Disk hub 21 and dish washer 32 are attached to spindle 30 by bolt 33. As shown in FIG. 1, three magnetic disks 34 are mounted on hub 21 and are separated by disk spacer rings 35. Disks 34 are held in position on hub 21 by action of bolt 33, washer 32 and the circular disk clamp 36.

Attached to the other end of the disk spindle 30 by means of a bolt 40 is the circular rotor 41 which, together with the stator 23, comprises the drive motor 42 for rotating spindle 30 and disks 34.

The components of the disk file are hermetically sealed from the atmosphere by means of a thin walled enclosure which comprises a base member 45 and container portion 46 which are seamed at 47, as shown in FIG. 2. Electrical leads for supplying power to the disk drive motor 42 and to the head actuator (not shown) may be brought into the enclosure by means of the arrangement shown in FIG. 3. As shown in FIG. 3, an opening is provided in the baseplate 20 which extends to the outside of the enclosure. Dimensions of the opening are such as to permit the necessary electrical leads to extend from their respective signal sources to the metal leads or pins 59 that are disposed in the ceramic plate 60. A circular, metal C-ring seal 61 is positioned between the upper surface of the baseplate 20 and the bottom surface of the ceramic plate 60 and suitable bolts 57 clamp the plate 60 to the baseplate 20. Seal 61 prevents helium from escaping from the enclosure. The external conductors are attached to the appropriate pins 59 in the plate 60. Likewise, the corresponding conductors (not shown) within the container are connected to the appropriate electrical components within the file.

The baseplate 20 is attached to a mounting block 48 by means of a series of bolts 62. The bottom of the baseplate 20 is provided with an annular groove 64 for receiving a circular metal seal 65 which has a C-shaped cross-section. Baseplate 20 is attached to the mounting block 48 which, in turn, is removably attached to thermal module 11 by bolts 66. Seal 64 prevents helium from leaking from the container between the two mating surfaces of plate 20 and mounting member 48.

The seam 47 for container 10 may be sealed in accordance with the teachings of applicant's cross-referenced application. The arrangement of the disk drive motor is such as to allow the heat that is generated in the stator 23 of the motor to be removed through the aluminum baseplate 20 by thermal conduction through the aluminum mounting block 48 to the module 11. Similarly, any heat generated by rotation of the disks 34 in the helium or by the action of the magnetic transducer actuator will be transferred to the support member 24 by thermal conduction and by thermal conduction through the baseplate 20 and block 48 to module 11. The efficiency of the convection transfer may be improved, if desired, by providing radially extending circumferentially disposed fins 69 on member 21 along with an impeller 72 on the hub 21 to increase circulation of the helium. Additionally, suitable insulation 73 could be applied to the exterior of the container to prevent any exchange of heat with the outside atmosphere through the walls of the container. The temperature control of the container will then be substantially under the control of thermal module 11 and the amount of heat being removed could be varied by the volume, temperature and velocity of the water passing through the module.

FIG. 4 is a diagrammatic sketch illustrating how a relatively large number of disk enclosures as shown in FIG. 1 may be mounted on a frame 81 in relatively close proximity to each other without any adverse temperature effects since little or no heat is being transferred to the atmosphere from any one of the enclosures. In FIG. 4, each thermal module 11 is attached to the cross member 82 of the frame 81 by suitable shock mountings 83. The respective inlet and outlet hoses 12 and 13 of the modules, as shown, share a common heat exchanger 86 but have individual close loop circulating systems. Each disk enclosure is provided with its own electronics board (not shown) which may be mounted on the exterior of the enclosure.

While the invention has been particularly shown and described with reference to a preferred embodiment thereof, it will be understood by those skilled in the art that various changes in the form and details may be made therein without departing from the spirit and scope of the invention.

Having thus described my invention, what I claim as new and desire to secure by Letters Patent is:

1. A magnetic disk file storage arrangement comprising a plurality of hermetically sealed fluid cooled disk files, each of said files including a disk enclosure and a temperature control module, said enclosure comprising:

a thin walled cylindrical shaped cover section and a substantially flat bottom section and means for sealing said sections together to form a hermetically sealed container for maintaining helium gas within said file at a pressure slightly above atmosphere;

said disk file including a baseplate and means for transferring heat generated within said enclosure to said baseplate;

said temperature control module including a support member, means for attaching said support member in an efficient heat transfer relationship with said baseplate outside of said container including means to seal a section of said baseplate to prevent said gas from escaping from said container, and a closed loop water cooling arrangement for permanently removing heat transferred from said baseplate to said support member to control the internal temperature of said disk enclosure, and means for mounting said files in close proximity to each other including a frame and means for resiliently attaching said support member of each said file to said frame and connecting said closed loop cooling arrangements for each of said files to a water to water heat exchanger to prevent the heat being removed from one file from adversely affecting the operation of said temperature control module of another file.

* * * * *